United States Patent [19]

Haisma et al.

[11] 4,397,669

[45] Aug. 9, 1983

[54] METHOD FOR THE PRECISION MOULDING OF GLASS ARTICLES, METHOD OF MANUFACTURING A MOULD, AND MOULD FOR THE PRECISION MOULDING OF GLASS ARTICLES

[75] Inventors: Jan Haisma; Johannes K. A. Boesten; Henderikus deVroome, all of Eindhoven, Netherlands

[73] Assignee: U.S. Philips Corporation, New York, N.Y.

[21] Appl. No.: 339,959

[22] Filed: Jan. 18, 1982

[30] Foreign Application Priority Data

Feb. 9, 1981 [NL] Netherlands ..................... 8100602

[51] Int. Cl.³ ...................... C03B 11/12; C03B 27/02
[52] U.S. Cl. ........................................ 65/30.14; 65/26; 65/103; 65/275; 65/305; 65/319; 65/374.13
[58] Field of Search ..................... 65/318, 319, 374.13, 65/103, 102, 275, 356, 26, 305, 30.14

[56] References Cited

U.S. PATENT DOCUMENTS 2,253,697 8/1941 Genesy ........................... 65/319 X
3,155,748 11/1964 Couri ........................... 65/374.13 X
3,244,497 4/1966 Copeland ........................... 65/356

FOREIGN PATENT DOCUMENTS 286880 11/1965 Australia ........................... 65/31

Primary Examiner—Arthur D. Kellogg
Attorney, Agent, or Firm—Paul R. Miller

[57] ABSTRACT

A method for the manufacture of a mould intended for the precision moulding of glass articles, notably aspherical lenses. The desired shape and dimensional accuracy are imparted to a mechanically treated preform by an accurate polishing operation. Subsequently, the polished preform is prestressed and reinforced by a chemothermal treatment. The surface of the mould thus obtained comprises an edge zone which is subject to compressive stress and which changes over, via a neutral stress-free zone, to the core which is subject to tensile stress. The mould in accordance with the invention has a longer life and produces moulded products having a quality which is higher than that of products made by means of known moulds.

10 Claims, 2 Drawing Figures

METHOD FOR THE PRECISION MOULDING OF GLASS ARTICLES, METHOD OF MANUFACTURING A MOULD, AND MOULD FOR THE PRECISION MOULDING OF GLASS ARTICLES

The invention relates to a method for the precision moulding of glass articles by hot-moulding of a glass in a mould.

The invention also relates to a method for the manufacture of a mould and also to a mould for the precision moulding of glass articles.

The invention notably relates to the precision moulding of glass lenses, particularly aspherical lenses. Lenses of this kind must have a given accuracy of shape and a given surface quality. In this context "precision" is to be understood to mean that immediately after moulding, that is to say without further treatment, the lens does not deviate by more than 0.5 μm from the desired curvature in any point and that the surface roughness amounts to less than 0.02 μm.

U.S. Pat. No. 4,098,596 describes a method for the moulding of optical lenses in a mould. The mould is made of tungsten carbide, a tungsten alloy or glassy carbon. Metals have the drawback that their crystal structure changes under the influence of the temperature cycles occurring during the hot moulding of glass (grain growth, crystallization etc.). Such changes are often accompanied by geometrical changes, with the result that metal moulds can be used only a limited number of times. Glassy carbon has the drawback that it is mechanically difficult to achieve the desired smoothness with the required accuracy of shape.

The geometrical stability and the life of the known moulds, therefore, are less than optimum.

The invention has for its object to provide a solution to the described problems.

For the precision moulding of glass articles by hot moulding of a glass in a mould in accordance with the invention, use is made of a prestressed and reinforced glass mould having an edge zone at the surface which is subject to compressive stress and which changes over, through a neutral stress-free zone, to the core which is subject to tensile stress.

A prestressed and reinforced glass mould has a longer life than a metal mould and is very capable of withstanding compressive and impact loads. When use is made of metal moulds, for example steel moulds, moulding must take place in an inert gas atmosphere; this is not required for a glass mould or only to a limited extent. The reinforced glass is better scratch-resistant than steel. A glass mould can be easily polished, even better than steel, so that a better surface quality can be obtained. Glass has a much lower dissipation of heat, so that the moulded product is chilled less, with the result that the surface quality is improved. Thanks to the lower dissipation of heat, lower moulding temperatures may be used, with the result that the risk of sticking between mould and moulded product is reduced and the range of feasible moulding temperatures is increased. Thanks to the lower mould temperatures possible, glass types requiring a higher moulding temperature can still be moulded.

It is to be noted that moulds of quartz glass for the moulding of plastic lenses are known from British Patent Specification No. 505,836. The shape of a mould of quartz glass is also stable, but a mould of prestressed reinforced glass is stronger, that is to say less brittle and less susceptible to impact, than a mould of quartz glass.

A method of manufacturing such a prestressed reinforced mould in accordance with the invention is characterized in that a glass preform is manufactured by a mechanical operation, the preform being subsequently subjected to an etching treatment, the moulding surface of the etched preform being mechanically treated, the treated mould ultimately being prestressed and reinforced by a chemothermal treatment.

The manufacture of a preform by a mechanical operation, for example, a grinding operation, can be performed by means of conventional mechanical means. This phase does not require precision. The preform has a low surface quality, that is to say it exhibits hair cracks. These hair cracks dissappear under the influence of the subsequent cold etching operation. At the same time, if necessary, the diameter of the preform is corrected during the etching operation. During the subsequent after-treatment for example a polishing operation, which should be effected with the required precision and which should preferably be performed under numerical control, the correct accuracy of shape is imparted to the moulding surface of the preform; the treated surface should be free of hair cracks. The preform thus treated has the required accuracy of shape and surface quality, but the mould is still breakable. The mould is made unbreakable by the ultimate chemothermal treatment whereby it is prestressed and reinforced.

The prestressing and reinforcement by the chemothermal treatment is based on ion exchange where $Na^+$ ions of the glass are replaced by $K^+$ ions. To this end, during the chemothermal treatment in accordance with the invention, the preform is treated for a number of hours in a bath consisting of $KNO_3$ with 0.2% by weight of $Al_2(SO_4)_3$ at a temperature of approximately 500° C. or higher.

On the surface of the mould the chemothermal treatment produces an edge zone with a penetration depth of about 100 to 200 μm and with a compressive stress profile. The compressive stress increases from a positive value at the free surface with penetration depth zero to a maximum value and decreases to the value zero with the edge zone changing over, by a neutral stress-free zone, to the core which is subject to tensile stress. It has been demonstrated that frequent moulding cycles with a mean temperature of the mould of 350° C. will not change the stress pattern in the mould either as regard to penetration depth or as regard to maximum compressive stress.

The chemothermal treatment may cause changes of the shape of the polished preform. The desired accuracy of shape can be imparted to such a mould by measuring the shape of the reinforced mould and, in the case of deviations from the required shape, by polishing the mould again and by subjecting it to a second chemothermal treatment.

The glass mould in accordance with the invention is characterized by being prestressed and reinforced and by comprising at the surface an edge zone which is subject to compressive stress and which changes over, by a neutral stress-free zone, to the core which is subject to tensile stress. The compressive stress in the edge zone first increases from a positive value at the free surface to a maximum value and subsequently decreases to zero.

The advantages of a prestressed reinforced glass mould have already been stated. Moreover, glass moulds offer the advantage that they are transparent.

For example, if a moulding process were used where a thin plastics layer which sets under the influence of ultraviolet light is provided around a glass core, the ultraviolet light could penetrate through the glass mould. If lenses were to be made of a composition of densely stacked glass spheres with an ultraviolet setting plastics material having the same refractive index as a binder, the ultraviolet light could penetrate through the glass mould.

The mould in accordance with the invention can be used more often than the known metal moulds, because no changes of shape due to structural changes occur during use.

Moulds in accordance with the invention are suitable for manufacturing glass articles up to temperatures of approximately 1000° C. Preferably, the glass articles are made by hot moulding at temperatures of from 300° to 600° C. For hot moulding of this kind, notably glasses are suitable which have an American softening point of less than 600° C. that is to say the temperature at which the viscosity amounts to $10^{6.6}$ Pa.s.

The invention will be described in detail hereinafter with reference to the drawing, wherein.

Figure 1:
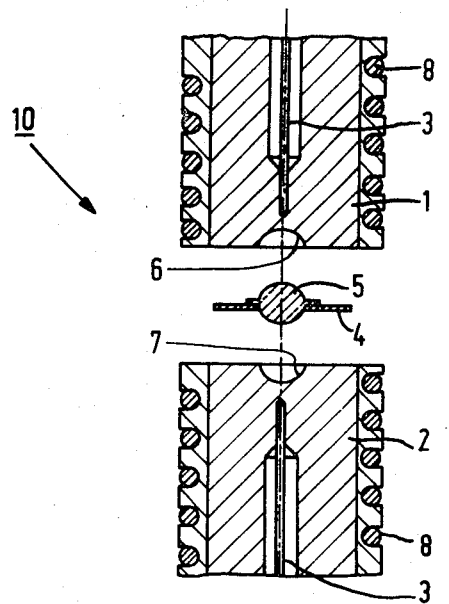
FIG. 1 is a sectional view of a moulding device comprising moulds in accordance with the invention.

FIG. 1 shows a moulding device 10 with a mould consisting of two mould halves 1 and 2, each of which includes a thermocouple 3. The moulding surfaces of the mould halves are denoted by the reference numerals 6 and 7. The reference numeral 8 denotes a heating wire whereby the two mould halves can be heated to the desired moulding temperature by a power supply and control system (not shown). A moulded glass article 5 is present on a carrier 4.

The mould halves 1 and 2 are manufactured in accordance with the invention as follows. A preform is made from glass by grinding and drilling. The surface of the preform is frosted due to the roughness of the surface. The preform is chemically etched in order to obtain a surface which is substantially free of hair cracks. The moulding surfaces 6 and 7 are treated on a special polishing lathe, for example, as described in Philips Technical Review 30. 117–133 (1969), so that the surface does not deviate by more than a few tenths of a micrometer from the desired surface and so that the surface roughness amounts to less than 0.02 $\mu$m, which means that it is optically smooth. The preform thus treated is subsequently prestressed and reinforced by a chemothermal treatment. To this end, the preform is immersed for a number of hours in a bath consisting of chemically pure $KNO_3$ whereto 0.2% by weight of $Al_2(SO_4)_3$ have been added. If the prestressed and reinforced mould half thus obtained does not have the required accuracy of shape, the polishing treatment and the subsequent chemothermal treatment are repeated.

Lenses can be moulded as follows by means of the described method. A preform, for example, a finely ground glass cube, is heated to a temperature in the vicinity of or slightly higher than the American softening point of the relevant glass. The cube is arranged on a carrier 4 and inserted between the mould halves 1 and 2 which have been heated to approximately 300° C. The glass cube is pressed for a few seconds between the mould halves at a pressure of, for example, 400–700 kPa. The moulded article 5 is subsequently removed from between the mould halves and is cooled, for example, in air.

In a practical example, glass moulds were made of a sodium aluminum silicate glass having the following composition in percent by weight:

|  | weight % | mol. % |
| --- | --- | --- |
| $SiO_2$ | 66.8 | 70.0 |
| $Al_2O_3$ | 14.6 | 9.0 |
| $NA_2O$ | 14.8 | 15.0 |
| MgO | 3.8 | 6.0 |
| $Sb_2O_3$ | 0.4 | — |

The glass has an annealing temperature of approximately 600° C., an American softening point of 855° C. and a coefficient of expansion of $8 \times 10^{-7}$.

Figure 2:
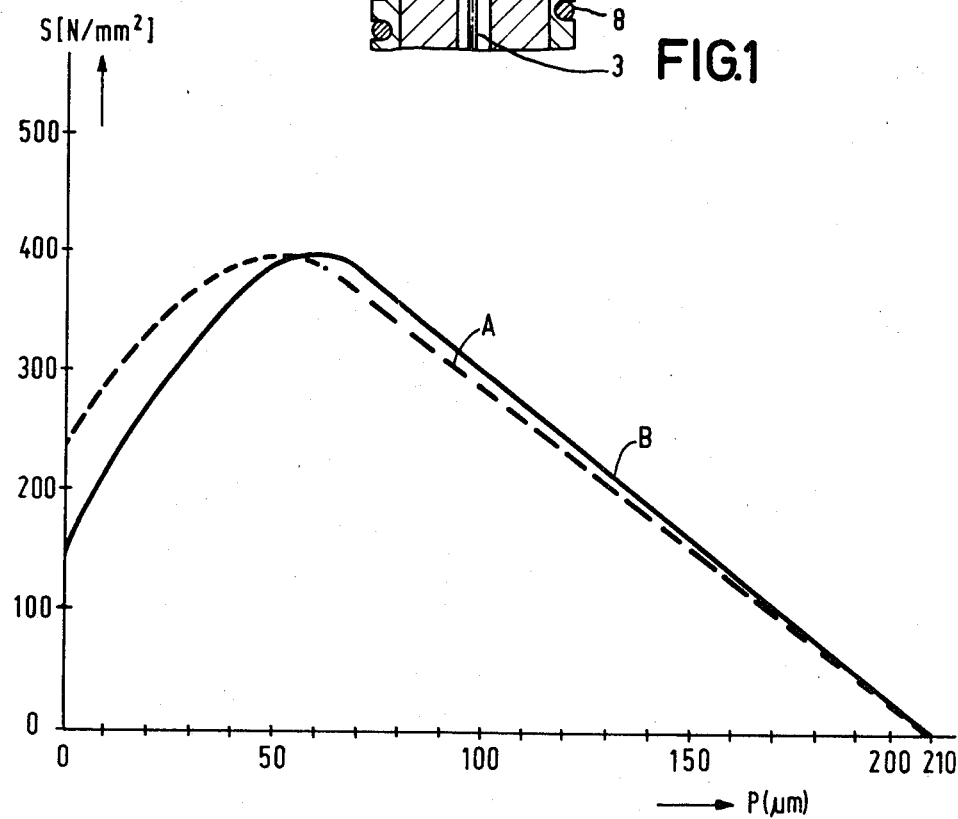
FIG. 2 shows a diagram of the compressive stress profile in the edge zone of the moulds.

FIG. 2 shows the compressive stress profile of the glass after the chemothermal treatment. The compressive stress value S is expressed in $N/mm^2$, the penetration depth P in $\mu$m. Measurements were performed on glass rods of the glass type.

The curve A in the diagram represents the stress profile after the chemothermal treatment of the glass rods: the rods were immersed for twenty-four hours in a bath of the composition at a temperature of 525° C. For a penetration depth 0 at the free surface, the compressive stress S amounted to 232 $N/mm^2$; the maximum compressive stress amounted to 393 $N/mm^2$ at a penetration depth P of 55 $\mu$m; the maximum penetration depth amounted to 210 $\mu$m at a compressive stress O. The curve b represents the stress profile after a thermal test treatment, performed to substite for a number of moulding cycles, of the rods which remained in an oven for twenty-four hours at a temperature of 350° C. The compressive stress at the free edge thus decreased to 143 $N/mm^2$ and the maximum compressive stress remained 393 $N/mm^2$ the penetration depth P at the stress O remained the same, i.e. 210 $\mu$m.

A comparison of the curve A and B clearly illustrates that the thermal test treatment or the moulding cycles do not adversely affect the reinforced character of the glass: the curves are merely shifted and the maximum stress value and the location of the stress zero point do not change.

The device shown in FIG. 1, comprising the described mould of sodium aluminium silicate glass, was used to make lenses of different kinds of glass. To this end, a cube dimensioned 8×8×8 mm was moulded between the mould halves at the moulding temperature stated below. The accuracy of shape, that is to say the deviation from the ideal shape and the smoothness of the contact surfaces of the mould, amounted to less than 0.1 $\mu$m and less than 0.02 $\mu$m, respectively. All moulded lenses had an accuracy of shape of less than 0.1 $\mu$m and a smoothness of less than 0.02 $\mu$m. Therefore, these lenses required no further polishing. The below table states the composition of the glasses used for the lenses and the moulding temperatures used. Also stated is the release time, that is to say the period of time within which the moulded glass lenses become detached from the mould due to shrinking.

TABLE

| Glass No. | Glass composition | Expansion coefficient per °C. | Moulding temperature | Release time |
| --- | --- | --- | --- | --- |
| (1) | FK3 (optical glass from | $820 \times 10^{-8}$ | 750° C. | approx. 5 s. |

TABLE-continued

| Glass No. | Glass composition | Expansion coefficient per °C. | Moulding temperature | Release time |
|---|---|---|---|---|
| | Schott) | | | |
| (2) | 87 wt. % PbO; 10 wt. % $SiO_2$ 1 wt. % $Sb_2O_3$; 1 wt. % $B_2O_3$; 0.5 wt. % $K_2O$; 0.5 wt. % rest | $940 \times 10^{-8}$ | 470° C. | 5–30 s. |
| (3) | 47 mol. % $P_2O_5$; 9 mol. % $Li_2O$; 19 mol. % BaO; 19 mol. % PbO; 0.9 mol. % $Al_2O_3$; 5.1 at. % F | $135 \times 10^{-8}$ | 440° C. | 8–20 s. |
| (4) | $As_2S_3$ | $2240 \times 10^{-8}$ | 325° C. | less than 10 s. |

What is claimed is:

1. A method for manufacturing a mould for precision moulding of glass articles comprising the steps of forming a glass preform capable of ion exchange, subjecting said preform to an etching treatment, treating the moulding surface of said preform by at least polishing, and prestressing and reinforcing said treated mould by a chemothermal ion exchange treatment, wherein said treatment includes treating said preform for a number of hours in a bath of $KNO_3$ with 0.2 percent by weight of $Al_2(SO_4)_3$ at a temperature of approximately 500° or higher.

2. A method according to claim 1, wherein the shape of said reinforced mould is measured, and wherein said mould is again polished and subjected to a second chemothermal ion exchange treatment in the case of deviations from a required shape.

3. A method according to claim 1, wherein said chemothermal ion exchange treatment forms an edge zone of said mould having a penetration depth of about 100 to 200 μm, said edge zone being under a compressive stress.

4. A method according to claim 3, wherein said compressive stress has a positive value at the surface where said penetration depth is zero, and said compressive stress increases to a maximum value and thereafter decreases to zero through said penetration depth.

5. A method according to claim 4, wherein said mould has a core zone subject to tensile stress and a stress-free zone between said core zone and said edge zone.

6. A method for manufacturing a mould for precision moulding glass articles comprising the steps of
   forming a glass preform capable of ion exchange by at least one of the operations of grinding and drilling,
   etching said preform to form a smooth surface,
   treating said glass preform by at least polishing to form an optically smooth surface and,
   carrying out a chemothermal ion exchange treatment of said glass preform to substantially prestress and reinforce said preform, such that said preform has a positive compressive stress at the surface of said preform, said compressive stress increasing to a maximum value and thereafter decreasing to zero within said glass preform, a core zone subject to a tensile stress, and a stress-free zone between said tensile stress and said compressive stress.

7. A mould for the precision moulding of glass articles comprising
   a glass mould structure having
   an edge zone with a penetration depth from the surface in the range of 100 to 200 μm,
   said edge zone having a compressive stress profile which is positive at zero penetration depth at said surface, increases to a maximum value, then decreases to zero,
   a core zone subject to a tensile stress, and
   a stress-free zone between said edge zone and said core zone.

8. A mould according to claim 7, wherein said glass mould structure is a sodium aluminium silicate glass.

9. A method for precision moulding glass articles comprising the steps of
   preparing a glass mould having a positive compressive stress at the surface, said compressive stress increasing to a maximum value and thereafter decreasing to zero, a core zone subject to a tensile stress, and a stress-free zone between said tensile stress and said compressive stress,
   inserting a glass article into said glass mould,
   heating said glass article to a moulding temperature in the vicinity of the American softening temperature of said glass article,
   pressing said glass article in said glass mould at a pressure between 400 to 700 kPa to form a moulded glass article, and
   removing said moulded glass article from said glass mould.

10. A method according to claim 9, wherein said glass article is a finely ground glass cube.

* * * * *